(12) United States Patent
Kott, Jr.

(10) Patent No.: US 6,438,854 B1
(45) Date of Patent: Aug. 27, 2002

(54) CENTER LINE MARKING APPARATUS

(76) Inventor: Edward J. Kott, Jr., 1281 Horseshoe Ln., Bartlett, IL (US) 60103

( * ) Notice: Subject to any disclaimer, the term of this patent is extended or adjusted under 35 U.S.C. 154(b) by 99 days.

(21) Appl. No.: 09/663,154

(22) Filed: Sep. 15, 2000

(51) Int. Cl.[7] .......................... G01B 11/00; G01C 9/00; B25B 5/00; B25B 5/02
(52) U.S. Cl. .......................... 33/286; 33/227; 33/370; 33/DIG. 21; 269/6
(58) Field of Search .................... 33/227, 228, 281, 33/282, 283, 285, 286, 370, 371, 372, 404, 406, 407, 410, DIG. 21; 24/524; 269/3, 6, 903; 29/281.1

(56) References Cited

U.S. PATENT DOCUMENTS

| | | | |
|---|---|---|---|
| 4,580,345 A | * | 4/1986 | Andrew ........................ 33/228 |
| 4,681,439 A | | 7/1987 | Shoemaker |
| 5,367,779 A | | 11/1994 | Lee |
| 5,394,616 A | | 3/1995 | Claxton |
| 5,505,000 A | | 4/1996 | Cooke |
| 5,754,582 A | | 5/1998 | Dong |
| D411,470 S | | 6/1999 | Webb |
| 6,029,964 A | * | 2/2000 | Bohl ............................. 269/6 |
| 6,052,911 A | * | 4/2000 | Davis ........................... 33/286 |
| 6,240,815 B1 | * | 6/2001 | Huang ........................... 269/6 |
| 6,338,475 B1 | * | 1/2002 | Ping ............................. 269/6 |
| 6,346,155 B1 | * | 2/2002 | Fox, IV ....................... 269/903 |
| 6,374,507 B1 | * | 4/2002 | Lehto ........................... 33/286 |

* cited by examiner

*Primary Examiner*—Diego Gutierrez
*Assistant Examiner*—Madeline Gonzalez

(57) ABSTRACT

A center line marking apparatus for marking holes or bores in beams for running pipe or electrical wiring through the beams. The center line marking apparatus includes a clamping assembly for clamping to a beam such as a joist; and also includes a first elongate support member being pivotally mounted to the clamping assembly; and further includes a laser marking assembly rotatably mounted to the elongate support member.

19 Claims, 5 Drawing Sheets

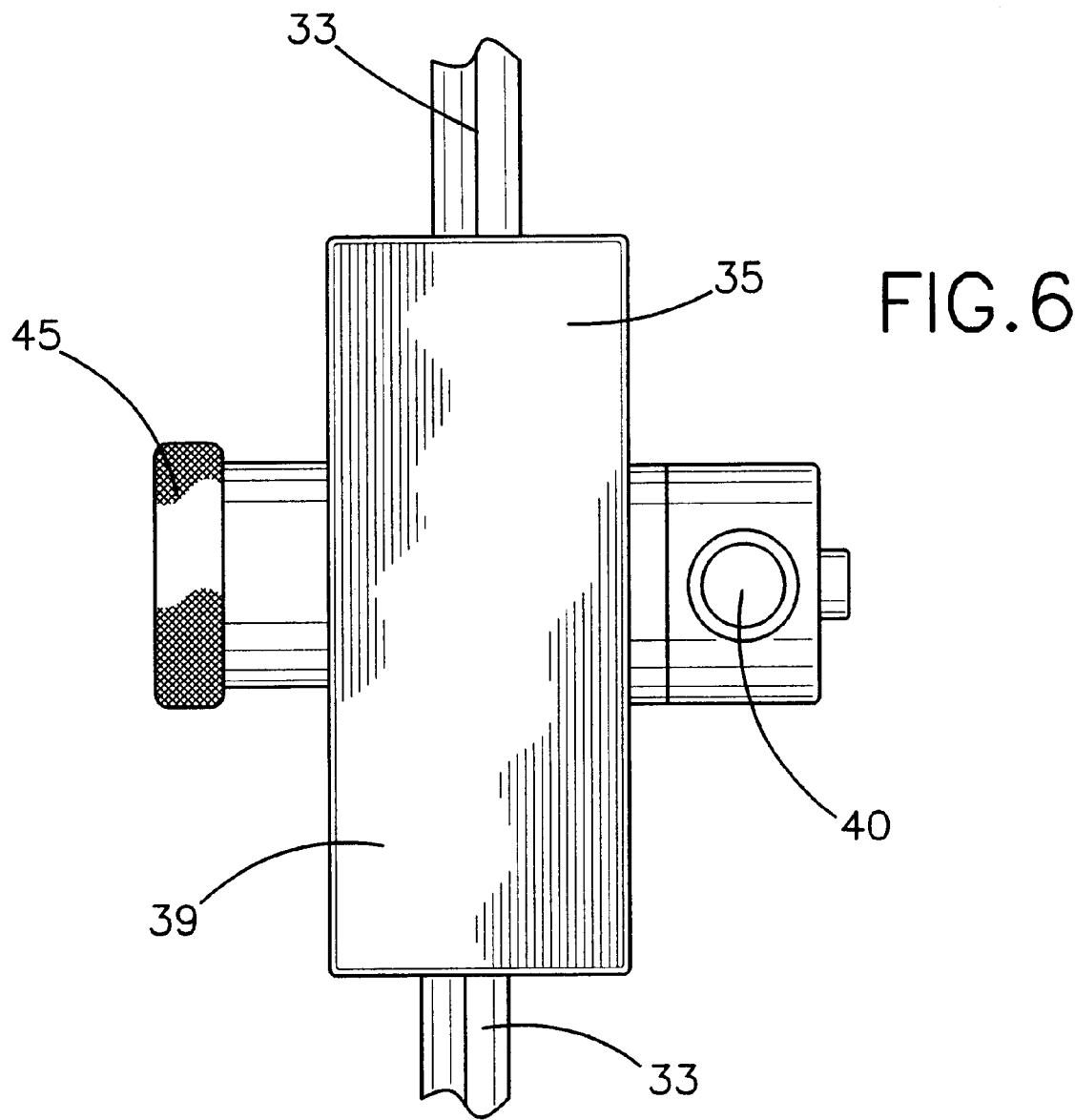

CENTER LINE MARKING APPARATUS

BACKGROUND OF THE INVENTION

1. Field of the Invention

The present invention relates to hole marking device for beams and more particularly pertains to a new center line marking apparatus for marking holes or bores in beams for running pipe or electrical wiring through the beams.

2. Description of the Prior Art

The use of hole marking device for beams is known in the prior art. More specifically, hole marking device for beams heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,367,779; 5,754,582; 5,505,000; 4,681,439; 5,394,616; and Des. 411,470.

While these devices fulfill their respective, particular objectives and requirements, the aforementioned patents do not disclose a new center line marking apparatus. The inventive device includes a clamping assembly for clamping to a beam such as a joist; and also includes a first elongate support member being pivotally mounted to the clamping assembly; and further includes a laser marking assembly rotatably mounted to the elongate support member.

In these respects, the center line marking apparatus according to the present invention substantially departs from the conventional concepts and designs of the prior art, and in so doing provides an apparatus primarily developed for the purpose of marking holes or bores in beams for running pipe or electrical wiring through the beams.

SUMMARY OF THE INVENTION

In view of the foregoing disadvantages inherent in the known types of hole marking device for beams now present in the prior art, the present invention provides a new center line marking apparatus construction wherein the same can be utilized for marking holes or bores in beams for running pipe or electrical wiring through the beams.

The general purpose of the present invention, which will be described subsequently in greater detail, is to provide a new center line marking apparatus and method which has many of the advantages of the hole marking device for beams mentioned heretofore and many novel features that result in a new center line marking apparatus which is not anticipated, rendered obvious, suggested, or even implied by any of the prior art hole marking device for beams, either alone or in any combination thereof.

To attain this, the present invention generally comprises a clamping assembly for clamping to a beam such as a joist; and also includes a first elongate support member being pivotally mounted to the clamping assembly; and further includes a laser marking assembly rotatably mounted to the elongate support member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new center line marking apparatus apparatus and method which has many of the advantages of the hole marking device for beams mentioned heretofore and many novel features that result in a new center line marking apparatus which is not anticipated, rendered obvious, suggested, or even implied by any of the prior art hole marking device for beams, either alone or in any combination thereof.

It is another object of the present invention to provide a new center line marking apparatus which may be easily and efficiently manufactured and marketed.

It is a further object of the present invention to provide a new center line marking apparatus which is of a durable and reliable construction.

An even further object of the present invention is to provide a new center line marking apparatus which is susceptible of a low cost of manufacture with regard to both materials and labor, and which accordingly is then susceptible of low prices of sale to the consuming public, thereby making such center line marking apparatus economically available to the buying public.

Still yet another object of the present invention is to provide a new center line marking apparatus which provides in the apparatuses and methods of the prior art some of the advantages thereof, while simultaneously overcoming some of the disadvantages normally associated therewith.

Still another object of the present invention is to provide a new center line marking apparatus for marking holes or bores in beams for running pipe or electrical wiring through the beams.

Yet another object of the present invention is to provide a new center line marking apparatus which includes a clamping assembly for clamping to a beam such as a joist; and also includes a first elongate support member being pivotally mounted to the clamping assembly; and further includes a laser marking assembly rotatably mounted to the elongate support member.

Still yet another object of the present invention is to provide a new center line marking apparatus that effectively and efficiently marks where the holes should be drilled in beams for running pipes and wires therethrough.

Even still another object of the present invention is to provide a new center line marking apparatus that quickly and accurately marks where the holes should be drilled in the beams.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is a second side elevational view of the present invention.

DESCRIPTION OF THE PREFERRED EMBODIMENT

Figure 1:
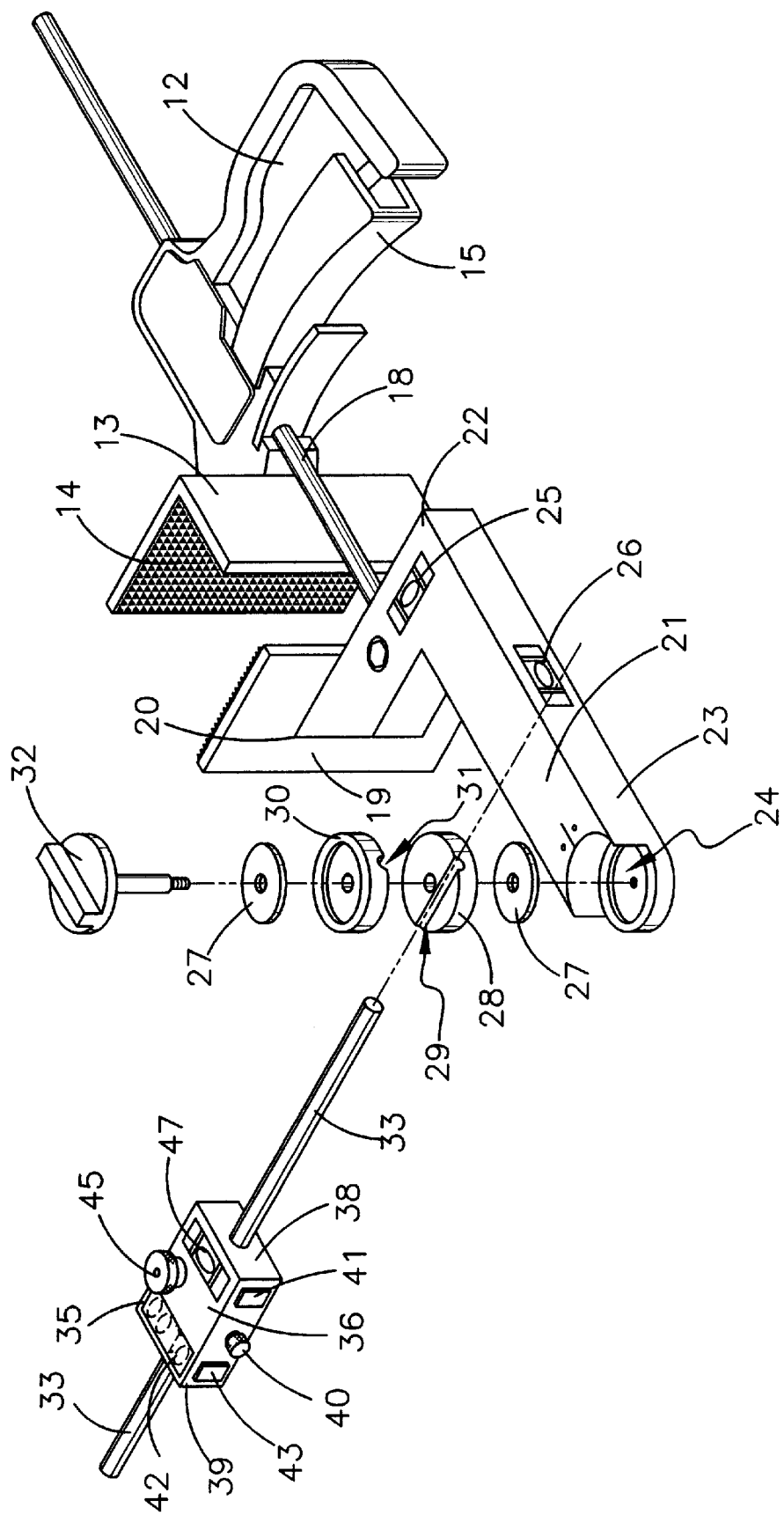
FIG. 1 is a perspective view of a new center line marking apparatus according to the present invention.
Figure 2:
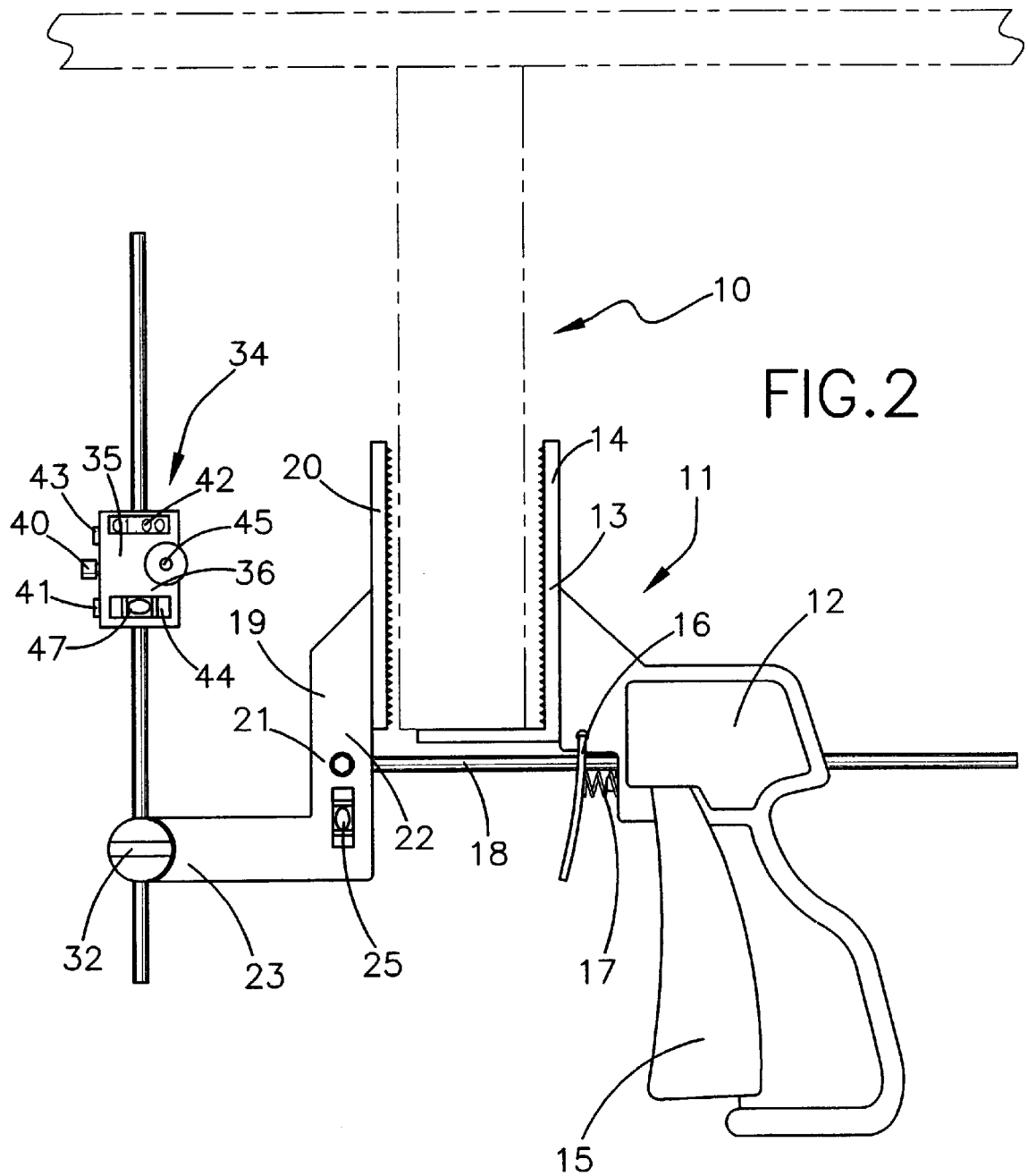
FIG. 2 is a side elevational view of the present invention.
Figure 3:
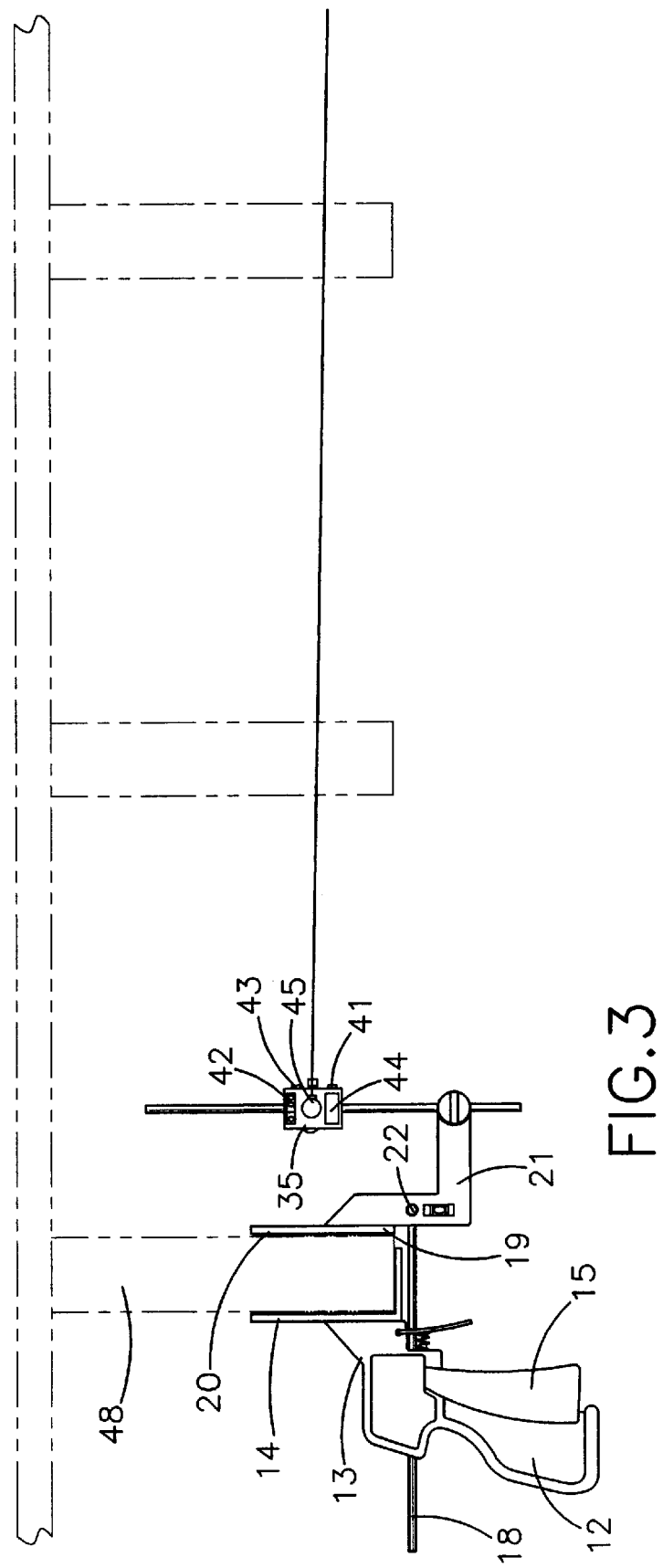
FIG. 3 is a side elevational view of the present invention shown in use.
Figure 4:
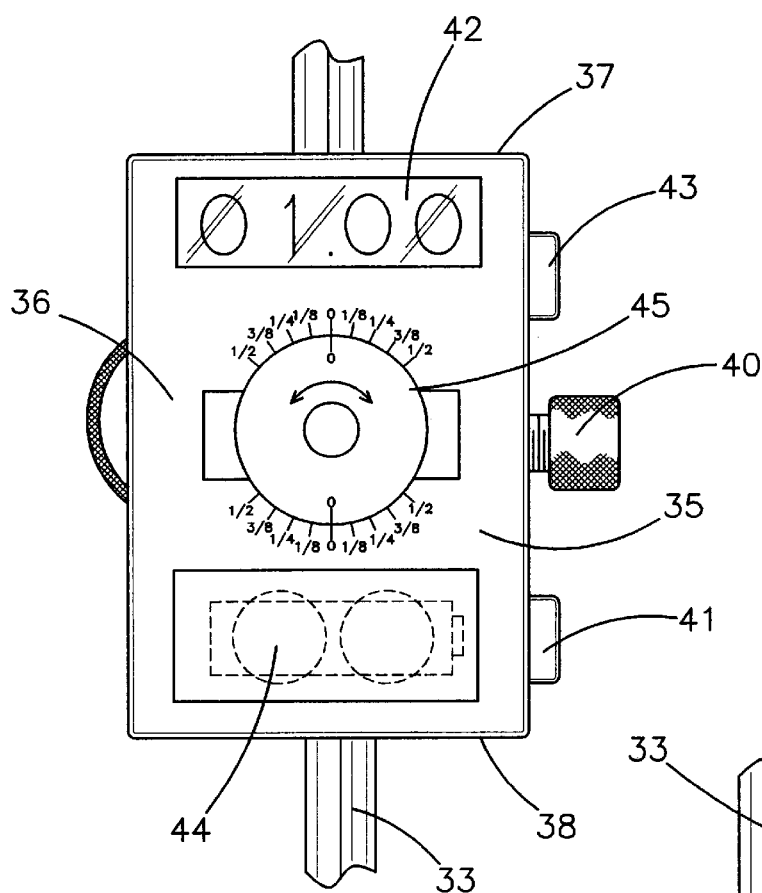
FIG. 4 is a front elevational view of the present invention.
Figure 5:
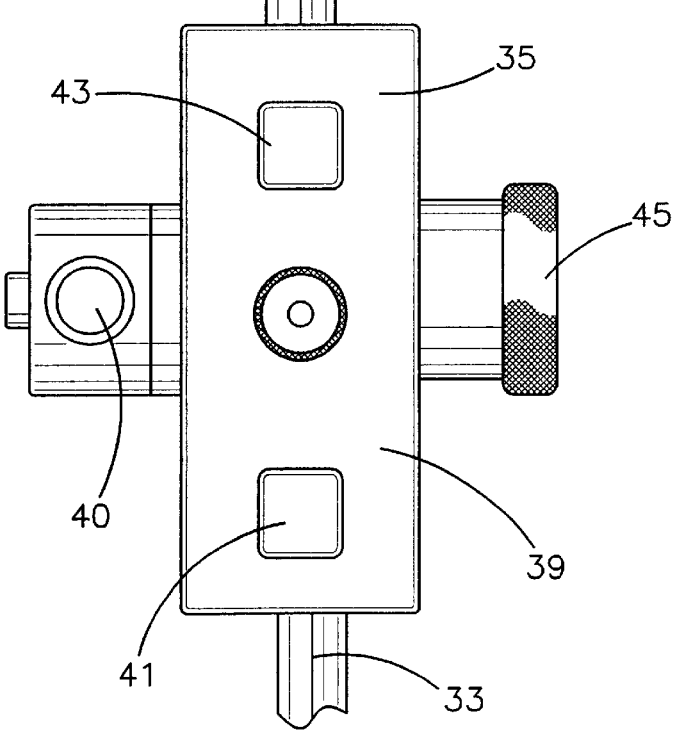
FIG. 5 is a first side elevational view of the present invention.

With reference now to the drawings, and in particular to FIGS. 1 through 6 thereof, a new center line marking apparatus embodying the principles and concepts of the present invention and generally designated by the reference numeral 10 will be described.

As best illustrated in FIGS. 1 through 6, the center line marking apparatus 10 generally comprises a clamping assembly 11 for clamping to a beam 48 such as a joist. The clamping assembly 11 includes a second elongate support member 18 and also includes a handle member 12 being movably and conventionally mounted to the elongate support member 18 and further includes a first jaw member 13 being securely and conventionally attached to the handle member 12 and also includes a second jaw member 19 being securely and conventionally attached to the second elongate support member 18. Each of the first and second jaw members 13,19 has a jaw portion 14,20 which is adapted to clamp and engage about a beam 48. The handle member 12 includes a trigger 15 being pivotally and biasedly attached to the handle member 12, a slide member 16 being movably and engagably mounted about the second elongate support member 18 for moving the handle member 12 relative to the second elongate support member 18, and a spring member 17 being mounted about the second elongate support member 18 for biasing the slide member 16 and the trigger 15 which is in contactable relationship with the slide member 16. The second elongate support member 18 extends through the handle member 12. The second jaw member 19 includes an arm member 21 having a first portion 22 and a second portion 23 being angled relative to the first portion 22 with the second portion 23 being disposed generally parallel to the second elongate support member 18 and having a cutaway end portion 24. The clamping assembly 11 includes two first bubble-tube levels 25,26 conventionally disposed in a wall of the arm member 21, one 25 of which is disposed upon the first portion 22 and the other 26 of which is disposed upon the second portion 23 for leveling the clamping assembly 11.

A first elongate support member 33 is pivotally mounted to the clamping assembly 11 with the clamping assembly 11 further including adjustable mounting members for pivotally mounting the first elongate support member 33 to the cutaway end portion 24 of the second portion 23 of the arm member 21. The adjustable mounting members include washer members 27, a first disc-like support member 28 having a groove 29 disposed in one side thereof, a second disc-like support member 30 being essentially mirrored to the first disc-like support member 28 and having a groove 31 dispose in one side thereof, and an adjustment knob 32 being extended through the first and second disc-like support members 28,30 and being threaded into the cutaway end portion 24 of the second portion 23 of the arm member 21 to securely fasten the first and second disc-like support members 28,30 together. The grooves 29,31 of the first and second disc-like support members 28,30 are adapted to receive and retain a portion of the first elongate support member 33. The first elongate support member 33 includes an end portion which is supported in the grooves 29,31 of the first and second disc-like support members 28,30 with the first elongate support member 28 being rotatable about its longitudinal axis.

A laser marking assembly 34 is rotatably mounted to the first elongate support member 33 with the laser marking assembly 34 including a housing 35 having front 36, side 39 and end 37,38 walls and also having holes through the end walls 37,38, and also including a laser light-emitting member 40 securely and conventionally attached to a back side of the housing 35 and being adapted to emit a beam of light perpendicular to the side walls 39 of the housing 35, and further including an LCD display screen 42 conventionally disposed in the front wall 36 of the housing 35 for displaying direction of the beam of light, and also including a directional setting member 45 being rotatably and conventionally disposed upon the front wall 36 of the housing 35 for setting the pitch of the beam of light, and further including at least one battery 44 being conventionally disposed in the housing 35, and also including a switch member 41 movably and conventionally disposed upon the housing 35 and being connected to the laser light-emitting member 40 and to the at least one battery 44 for energizing the light-emitting member 40, and further including a reset switch 43 conventionally disposed in and upon one of the walls of the housing 35 and being connected to the LCD display screen 42 for resetting the display on the LCD display screen 42, and also including a second bubble-tube level 47 securely disposed in and upon said front wall 36 of said housing 35. The first elongate support member 33 is rotatably extended through the housing 35 and through the holes in the housing 35 with the first elongate support member 33 having a plurality of markings disposed thereupon for setting the laser light-emitting member 40 relative to the clamping assembly 11. The directional setting member 45 includes a dial member [46] movably disposed upon the front wall 36 of the housing 35.

In use, the user clamps the first and second jaw members 13,19 about a beam 48 or joist with the first elongate support member 33 being essentially perpendicular to the beam 48 or joist. The user would move the laser light-emitting member 40 upon the first elongate support member 33 and would sight a clip placed upon another beam 48 or joist to essentially align holes or bores through the beams 48 or joists.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A center line marking apparatus comprising:
    a clamping assembly for clamping to a beam;
    a first elongate support member being pivotally mounted to said clamping assembly; and
    a laser marking assembly rotatably mounted to said elongate support member;
    wherein said clamping assembly includes a second elongate support member, and also includes a handle member being movably mounted to said second elongate support member, and further includes a first jaw member being securely attached to said handle member, and also includes a second jaw member being securely attached to said second elongate support member, each of said first and second jaw members having a jaw portion which is adapted to clamp and engage about a beam.

2. A center line marking apparatus as described in claim 1, wherein said handle member includes a trigger pivotally and biasedly attached to said handle member, a slide member movably mounted about said second elongate support member for moving said handle member relative to said second elongate support member, and a spring member being mounted about said second elongate support member for biasing said slide member and said trigger which is in contactable relationship with said slide member, said second elongate support member extending through said handle member.

3. A center line marking apparatus as described in claim 1, wherein said second jaw member includes an arm member having a first portion and a second portion being angled relative to said first portion, said second portion being disposed generally parallel to said second elongate support member and having a cutaway end portion.

4. A center line marking apparatus as described in claim 3, wherein said clamping assembly includes first bubble-tube levels disposed in a wall of said arm member, one of which is disposed upon said first portion and the other of which is disposed upon said second portion for leveling said clamping assembly.

5. A center line marking apparatus as described in claim 3, wherein said clamping assembly includes adjustable mounting members for mounting said first elongate support member to said cutaway end portion of said second portion of said arm member.

6. A center line marking apparatus as described in claim 5, wherein said adjustable mounting members include washer members, a first disc-like support member having a groove disposed in one side thereof, a second disc-like support member being essentially mirrored to said first disc-like support member and having a groove dispose in one side thereof, and an adjustment knob being extended through said first and second disc-like support members and being threaded into said cutaway end portion of said second portion of said arm member for fastening said first and second disc-like support members together, said grooves of said first and second disc-like support members being adapted to receive and retain a portion of said first elongate support member.

7. A center line marking apparatus as described in claim 6, wherein said first elongate support member includes an end portion which is supported in said grooves of said first and second disc-like support members, said first elongate support member being rotatable about its longitudinal axis.

8. A center line marking apparatus as described in claim 1, wherein said laser marking assembly includes a housing having front, side and end walls and also having holes through said end walls, and also includes a laser light-emitting member securely attached to a back wall of said housing and being adapted to emit a beam of light perpendicular to said side walls of said housing, and further includes a display screen disposed in said front wall of said housing for displaying direction of said beam of light, and also includes a directional setting member being rotatably disposed upon said front wall of said housing for setting the pitch of said beam of light, and further includes at least one battery being disposed in said housing, and also includes a switch member movably disposed upon said housing and being connected to said laser light-emitting member and to said at least one battery for energizing said light-emitting member, and further includes a reset switch disposed in and upon one of said walls of said housing and being connected to said display screen for resetting a display upon said display screen, and also includes a second bubble-tube level securely disposed in and upon said front wall of said housing.

9. A center line marking apparatus as described in claim 8, wherein said first elongate support member is rotatably extended through said housing and through said holes in said housing, said first elongate support member having a plurality of markings disposed thereupon for setting said laser light-emitting member relative to said clamping assembly.

10. A center line marking apparatus comprising:

a clamping assembly for clamping to a beam, said clamping assembly including a second elongate support member, and also including a handle member being movably mounted to said elongate support member, and further including a first jaw member being securely attached to said handle member, and also including a second jaw member being securely attached to said second elongate support member, each of said first and second jaw members having a jaw portion which is adapted to clamp and engage about a beam, said handle member including a trigger pivotally and biasedly attached to said handle member, a slide member movably mounted about said second elongate support member for moving said handle member relative to said second elongate support member, and a spring member being mounted about said second elongate support member for biasing said slide member and said trigger which is in contactable relationship with said slide member, said second elongate support member extending through said handle member, said second jaw member including an arm member having a first portion and a second portion being angled relative to said first portion, said second portion being disposed generally parallel to said second elongate support member and having a cutaway end portion, said clamping assembly including first bubble-tube levels disposed in a wall of said arm member, one of which is disposed upon said first portion and the other of which is disposed upon said second portion for leveling said clamping assembly;

a first elongate support member being pivotally mounted to said clamping assembly, said clamping assembly including adjustable mounting members for mounting said first elongate support member to said cutaway end portion of said second portion of said arm member, said adjustable mounting members including washer members, a first disc-like support member having a groove disposed in one side thereof, a second disc-like support member being essentially mirrored to said first disc-like support member and having a groove dispose in one side thereof, and an adjustment knob being extended through said first and second disc-like support members and being threaded into said cutaway end portion of said second portion of said arm member for fastening said first and second disc-like support members together, said grooves of said first and second disc-like support members being adapted to receive and retain a portion of said first elongate support member, said first elongate support member including an end portion which is supported in said grooves of said first and second disc-like support members, said first elongate support member being rotatable about its longitudinal axis; and a laser marking assembly rotatably mounted to said elongate support member, said laser marking assembly including a housing having front, side and end walls and also having holes through said end walls, and also including a laser light-emitting member securely attached to a back wall of said housing and being adapted to emit a beam of light perpendicular to said side walls of said housing, and further including a display screen disposed in said front wall of said housing for displaying direction of said beam of light, and also including a directional setting member being rotatably disposed upon said front wall of said housing for setting the pitch of said beam of light, and further including at least one battery being disposed in said housing, and also including a switch member movably disposed upon said housing and being connected to said laser light-emitting member and to said at least one battery for energizing said light-emitting member, and further including a reset switch disposed in and upon one of said wails of said housing and being connected to said display screen for resetting a display upon said display screen, and also including a second bubble-tube level securely disposed in and upon said front wall of said housing, said first elongate support member being rotatably extended through said housing and through said holes in said housing, said first elongate support member having a plurality of markings disposed thereupon for setting said laser light-emitting member relative to said clamping assembly.

11. A center line marking apparatus comprising:

a clamping assembly for clamping to a beam;

a first support member being pivotally mounted to said clamping assembly; and a laser marking assembly rotatably mounted to said elongate support member;

wherein said clamping assembly includes:

a second support member;

a handle member being movably mounted to said second support member;

a first jaw member attached to said handle member; and a second jaw member attached to said second support member;

wherein each of said first and second jaw members has a jaw portion for clamping a beam.

12. A center line marking apparatus as described in claim 11, wherein said handle member includes a trigger pivotally attached to said handle member, a slide member movably mounted about said second support member for moving said handle member relative to said second support member, and a spring member being mounted about said second support member for biasing said slide member and said trigger which is in contactable relationship with said slide member, said second support member extending through said handle member.

13. A center line marking apparatus as described in claim 11, wherein said second jaw member includes an arm member having a first portion and a second portion being angled relative to said first portion, said second portion being disposed generally parallel to said second support member and having a cutaway end portion.

14. A center line marking apparatus as described in claim 13, wherein said clamping assembly includes first bubble-tube levels disposed in a wall of said arm member, one of which is disposed upon said first portion and the other of which is disposed upon said second portion for leveling said clamping assembly.

15. A center line marking apparatus as described in claim 13, wherein said clamping assembly includes adjustable mounting members for mounting said first elongate support member to said cutaway end portion of said second portion of said arm member.

16. A center line marking apparatus as described in claim 15, wherein said adjustable mounting members include washer members, a first disc member having a groove disposed in one side thereof, a second disc member having a groove dispose in one side thereof, the groove of said first disc member being in opposition to the groove of said second disc member, and an adjustment knob being extended through said first and second disc members and being threaded into said second jaw member for fastening said first and second disc members together, said grooves of said first and second disc members being adapted to receive and retain a portion of said first support member.

17. A center line marking apparatus as described in claim 16, wherein said first support member includes an end portion which is supported in said grooves of said first and second disc members, said first support member being rotatable about its longitudinal axis.

18. A center line marking apparatus as described in claim 11, wherein said laser marking assembly includes a housing, a laser light-emitting member attached to said housing and being adapted to emit a beam of light, a display screen disposed in said housing for displaying a direction of said beam of light, a directional setting member being rotatably disposed upon said housing for setting the pitch of said beam of light, and a second bubble-tube level disposed on said housing.

19. A center line marking apparatus as described in claim 18, wherein said first support member is rotatably extended through said housing, said first support member having a plurality of markings disposed thereupon for setting said laser light-emitting member relative to said clamping assembly.

* * * * *